United States Patent
Mutikainen et al.

(10) Patent No.: US 9,432,873 B2
(45) Date of Patent: Aug. 30, 2016

(54) DIFFERENTIATION OF TRAFFIC FLOWS FOR UPLINK TRANSMISSION

(71) Applicant: Nokia Technologies Oy, Espoo (FI)

(72) Inventors: Jari Mutikainen, Lepsama (FI); Jarkko Tuomo Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 83 days.

(21) Appl. No.: 14/271,977

(22) Filed: May 7, 2014

(65) Prior Publication Data

US 2014/0341017 A1  Nov. 20, 2014

Related U.S. Application Data

(60) Provisional application No. 61/825,250, filed on May 20, 2013.

(51) Int. Cl.
*H04L 12/26* (2006.01)
*H04W 28/02* (2009.01)
*H04L 12/851* (2013.01)

(52) U.S. Cl.
CPC ...... *H04W 28/0268* (2013.01); *H04L 47/2433* (2013.01)

(58) Field of Classification Search
CPC .................. H04W 28/0268; H04L 47/2433
USPC .................................................. 370/229–235
See application file for complete search history.

(56) References Cited

U.S. PATENT DOCUMENTS

| 9,055,557 B1* | 6/2015 | Bayar ................ H04W 76/02 |
| 2013/0003566 A1* | 1/2013 | Munoz de la Torre Alonso ........... H04W 76/041 370/252 |
| 2013/0242887 A1* | 9/2013 | Zhu .................. H04W 72/0413 370/329 |
| 2015/0124718 A1* | 5/2015 | Molinero Fernandez .......... H04L 65/1016 370/329 |

OTHER PUBLICATIONS

"3rd Generation Partnership Project; Technical Specification Group Services and System Aspects; System Enhancements for User Plane Congestion Management (Release 12)", 3GPP TR 23.705, V0.2.0, Feb. 2013, pp. 1-9.
"Prioritization of IP Flows Mapped to the Same QCI", SA WG2 Meeting #96, S2-131494, Agenda: 7.6, Telecom Italia et al., Apr. 8-12, 2013, pp. 1-5.
"3rd Generation Partnership Project; Technical Specification Group Services and System Aspects; Policy and Charging Control Architecture (Release 11)", 3GPP TS 23.203, V11.9.0, Mar. 2013, pp. 1-180.

(Continued)

*Primary Examiner* — Phuc Tran
(74) *Attorney, Agent, or Firm* — Mintz Levin Cohn Ferris Glovsky and Popeo, P.C.

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: receive at least one traffic flow; receive at least one quality of service indication associated with the at least one traffic flow; create binding of the received at least one quality of service indication and information associated with the received at least one traffic flow; and assign a quality of service indication to a data packet for transmission based at least in part on the created binding.

18 Claims, 5 Drawing Sheets

(56) References Cited

OTHER PUBLICATIONS

"Solution Alternative Enhancing Existing QoS Bearer Concept", SA WG2 Meeting #96, S2-131179, Agenda: 7.6, Nokia Siemens Networks et al., Apr. 8-12, 2013, pp. 1-4.

"3rd Generation Partnership Project; Technical Specification Group Radio Access Network; Evolved Universal Terrestrial Radio Access (E-UTRA); Medium Access Control (MAC) Protocol Specification (Release 11)", 3GPP TS 36.321, V11.2.0, Mar. 2013, pp. 1-56.

"3rd Generation Partnership Project; Technical Specification Group Radio Access Network; Evolved Universal Terrestrial Radio Access (E-UTRA); Radio Resource Control (RRC); Protocol Specification (Release 11)", 3GPP TS 36.331, V11.3.0, Mar. 2013, pp. 1-344.

"3rd Generation Partnership Project; Technical Specification Group Core Network and Terminals; General Packet Radio System (GPRS) Tunnelling Protocol User Plane (GTPv1-U) (Release 11)", 3GPP TS 29.281, V11.6.0, Mar. 2013, pp. 1-27.

"3rd Generation Partnership Project; Technical Specification Group Radio Access Network; Evolved Universal Terrestrial Radio Access (E-UTRA); Radio Link Control (RLC) Protocol Specification (Release 11)", 3GPP TS 36.322, V11.0.0, Sep. 2012, pp. 1-39.

"3rd Generation Partnership Project; Technical Specification Group Radio Access Network; Evolved Universal Terrestrial Radio Access (E-UTRA); Packet Data Convergence Protocol (PDCP) Specification (Release 11)", 3GPP TS 36.323, V11.2.0, Mar. 2013, pp. 1-27.

U.S. Appl. No. 14/271,045, "Differentiation of Traffic Flows Mapped to the Same Bearer", filed May 6, 2014, 19 pages.

* cited by examiner

DIFFERENTIATION OF TRAFFIC FLOWS FOR UPLINK TRANSMISSION

CROSS-REFERENCE TO RELATED APPLICATION

The present application claims priority to U.S. Provisional Patent Application No. 61/825,250, filed May 20, 2013, and entitled "DIFFERENTIATION OF TRAFFIC FLOWS FOR UPLINK TRANSMISSION". The present application incorporates the disclosure of this application herein by reference in its entirety.

TECHNICAL FIELD

The present application relates generally to wireless communications and, more specifically, differentiation of traffic flows for uplink transmission.

BACKGROUND

Quality of service (QoS) provides access network operators and service operators with a set of tools to enable service and subscriber differentiation. Such tools are becoming increasingly important as operators are moving from a single to a multi-service offering at the same time as both the number of mobile broadband subscribers and the traffic volume per subscriber is rapidly increasing.

Bearer is the enabler for traffic separation, it provides differential treatment for traffic with differing QoS requirements. The bearer is the level of granularity for bearer-level QoS control. That is, all packet flows mapped to the same bearer receive the same packet-forwarding treatment. The packet-forwarding treatment comprises, for example, scheduling policy and queue management policy. Providing different packet-forwarding treatment requires separate bearers. QoS is class-based, where each bearer is assigned one and only one QoS class identifier (QCI) by the network. The QCI is a scalar that is used within the access network as a reference to node-specific parameters that control packet forwarding treatment.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: receive at least one traffic flow; receive at least one quality of service indication associated with the at least one traffic flow; create binding of the received at least one quality of service indication and information associated with the received at least one traffic flow; and assign a quality of service indication to a data packet for transmission based at least in part on the created binding.

According to a second aspect of the present invention, a method comprising: receiving at least one traffic flow; receiving at least one quality of service indication associated with the at least one traffic flow; creating binding of the received at least one quality of service indication and information associated with the received at least one traffic flow; and assigning a quality of service indication to a data packet for transmission based at least in part on the created binding.

According to a third aspect of the present invention, a computer program product comprising a computer-readable medium bearing computer program code embodied therein for use with a computer, the computer program code comprising: code for receiving at least one traffic flow; code for receiving at least one quality of service indication associated with the at least one traffic flow; code for creating binding of the received at least one quality of service indication and information associated with the received at least one traffic flow; and code for assigning a quality of service indication to a data packet for transmission based at least in part on the created binding.

According to a fourth aspect of the present invention, an apparatus comprising: at least one processor; and at least one memory including computer program code, wherein the at least one memory and the computer program code are configured to, with the at least one processor, cause the apparatus to perform at least the following: receive at least one traffic flow; receive at least one quality of service indication associated with the at least one traffic flow; and send the at least one traffic flow and the at least one quality of service indication associated with the at least one traffic flow.

According to a fifth aspect of the present invention, an apparatus comprising: means for receiving at least one traffic flow; means for receiving at least one quality of service indication associated with the at least one traffic flow; means for creating binding of the received at least one quality of service indication and information associated with the received at least one traffic flow; and means for assigning a quality of service indication to a data packet for transmission based at least in part on the created binding.

According to a sixth aspect of the present invention, an apparatus comprising: means for receiving at least one traffic flow; means for receiving at least one quality of service indication associated with the at least one traffic flow; and means for sending the at least one traffic flow and the at least one quality of service indication associated with the at least one traffic flow.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Radio access network (RAN) user plane congestion occurs when the demand for RAN resources exceeds the available RAN capacity to deliver the user data for a period of time. Although most of the Internet traffic is downlink direction, there are many applications that generate significant amount of uplink traffic, for example, video telephony and P2P file sharing. Furthermore, some transport control protocol (TCP) based applications which mainly utilizes downlink, for example, video on demand streaming, may get congested only because the TCP acknowledgements in uplink direction get congested in RAN. One reason is that the TCP sender decreases the sending speed if the TCP acknowledgements received are delayed. Therefore it is important to provide a solution to prevent or solve uplink congestion.

The subject matter disclosed herein provides a way for the network to improve the end user perceived service quality in RAN congestion situations, by traffic flow identification and prioritization. Specifically, there is provided a way of tracking the flows in downlink direction at a user equipment and assigning corresponding packets in uplink direction with the same QCI values—allowing the user equipment to reuse the downlink QoS bearer optimization for uplink congestion mitigation and allowing the network to prioritize the uplink packet data transmission at the user equipment.

Figure 1:
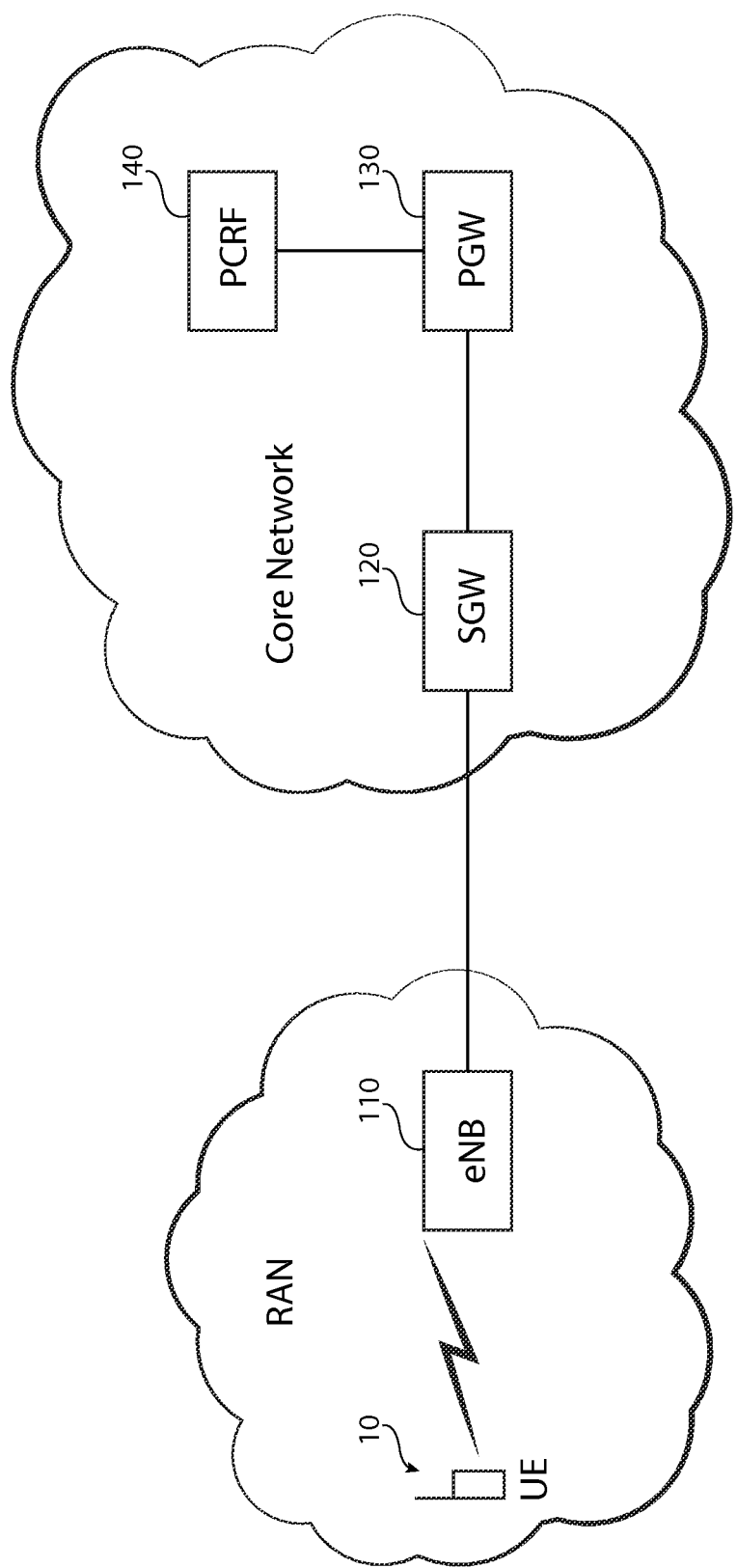
FIG. 1 depicts an example of a network in which some embodiments of the present invention may be practiced.

FIG. 1 illustrates an example of a network in which some example embodiments of the present invention may be practiced. As illustrated in FIG. 1, the User Equipment (UE) 10 is connected to the core network through an Evolved NodeB (eNB) 110 via Radio Access Network (RAN). It is noted that eNB 110 may be any type of control or base station. In some example embodiments, the core network may comprise network elements such as the Serving Gateway (SGW) 120, the PDN Gateway (PGW) 130, and the Policy and Charging Rules Function (PCRF) 140. The gateways, for example, the SGW 120 and the PGW 130, deal with the user plane data transfer. They transport the IP data traffic between the UE 10 and the external networks. The SGW 120 is the point of interconnect between RAN and core network. This gateway serves the UE 10 by routing the incoming and outgoing IP packets. It is logically connected to the other gateway, for example, the PGW 130. The PGW 130 is the point of interconnect between the core network and the external packet data networks. The PGW 130 routes packets to and from the external packet data networks. The PDN GW 130 also performs various functions such as policy enforcement, packet filtering for each UE, charging support, lawful interception and packet screening. PCRF 140 is a software node designated in real-time to determine policy rules for each UE. PCRF 140 supports the detection of service data flow, the charging system based on this data flow, and policy enforcement. Quality of service (QoS) rules and regulations are distributed to the PGW 130 by the PCRF 140.

It is noted that the network elements are for illustration purpose, some of the network elements, for example, SGW and PGW, may be SGSN and GGSN in Global System for Mobile communications (GSM) and 3G networks. It is also noted that these gateways may be physically separated or they may be combined into single equipment.

Figure 2:
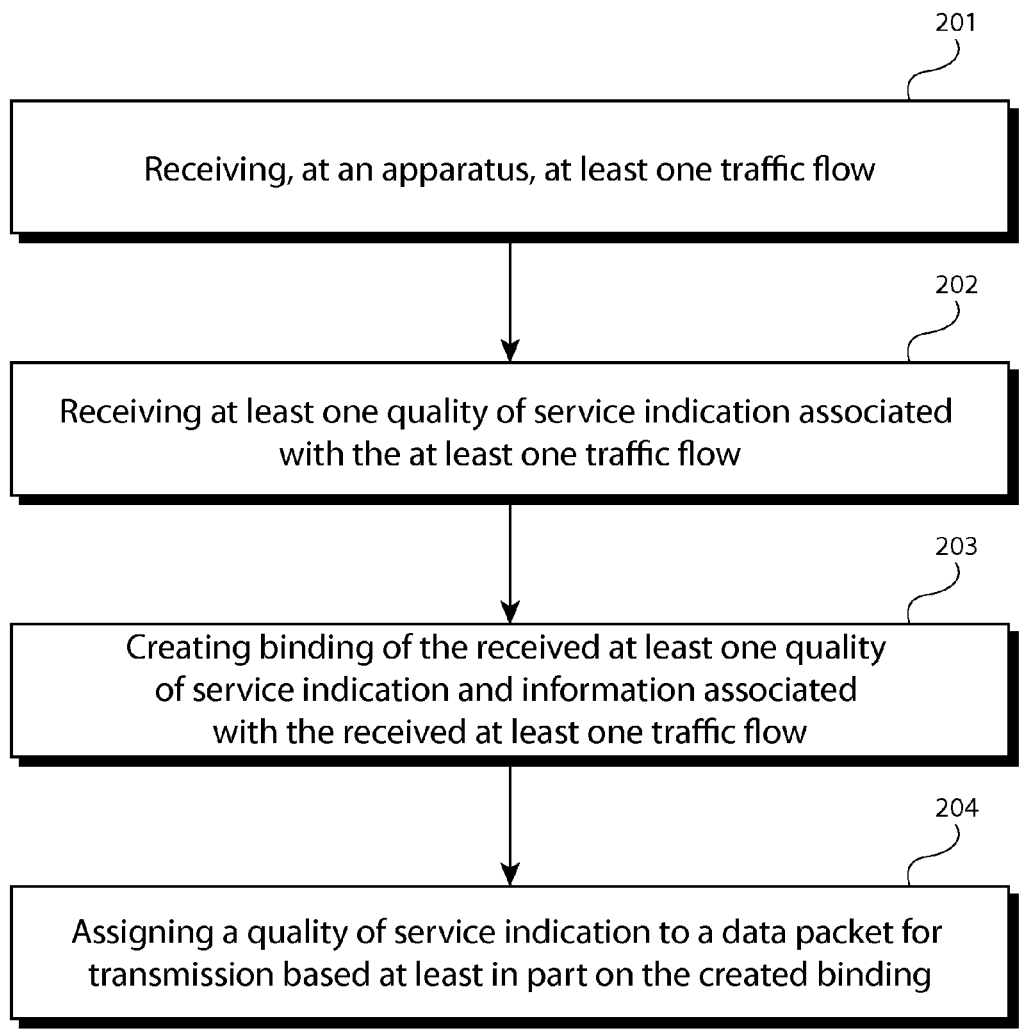
FIG. 2 depicts an example process for traffic flow differentiation at a user equipment in accordance with some embodiments of the invention.

FIG. 2 depicts an example process for traffic flow differentiation in accordance with some embodiments of the invention. The example process may be performed by or in an apparatus, such as user equipment 10.

At 201, at least one traffic flow is received at the apparatus.

At 202, the apparatus receives at least one quality of service indication associated with the at least one traffic flow. The quality of service indication may be a QCI value. QCI is a scalar that is used within the access network as a reference to node-specific parameters that control packet forwarding treatment. Each QCI value is associated with standardized QCI characteristics. The characteristics describe the packet forwarding treatment that the bearer traffic receives edge-to-edge between the UE and the gateway in terms of resource type, priority, packet delay budget, packet error loss rate. For example, reference can be made to 3GPP TS 23.203 V11.9.0 (2013-03) 3rd Generation Partnership Project; Technical Specification Group Services and System Aspects; Policy and charging control architecture (Release 11). The one-to-one mapping of QCI values to standardized QCI characteristics in the reference is illustrated in Table 1.

TABLE 1

Standardized QCI characteristics

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS Signalling |
| 6 (NOTE 4) | | 6 | 300 ms | $10^{-6}$ | Video (Buffered Streaming) TCP-based (e.g., www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) TCP-based (e.g., www, e-mail, chat, ftp, p2p file sharing, progressive video, etc.) |
| 9 (NOTE 6) | | 9 | | | |

In some example embodiments, the received at least one quality of service indication may comprise a bearer level QCI. In some example embodiments, the received at least one quality of service indication may further comprise a traffic flow level QCI. One or more traffic flows may be carried on the same bearer. The one or more traffic flows carried on the same bearer may have the same or different traffic flow level QCI values.

It is noted that QCI is used as quality of service indication and will be hereinafter described for purposes of example, any other type of quality of service indicator may be used according to the present invention.

At 203, the apparatus creates binding of the received one or more QCI values and information associated with the received at least one traffic flow. For example, the apparatus may track the traffic flows received in downlink direction and create a flow table which contains the traffic flows received at the apparatus. The apparatus stores the binding of received one or more QCI values for the traffic flows received in downlink direction to the table. An example is illustrated in Table 2, where four traffic flows in downlink direction are received at the apparatus. Each traffic flow forms an entry to the table. The apparatus stores a packet level QCI and bearer level QCI for each received traffic flow. Flow entries which are aged out may be actively removed by the apparatus, for example, TCP FIN packet may be used to trigger flow removal. In some example embodiments, the information associated with the received at least one traffic flow may comprise at least one of the following information: remote IP address, local port number, remote port number and protocol ID. It is noted that remote and destination may be used interchangeably and local and source may also be used interchangeably. It is also noted traffic flow level QCI and packet level QCI may be used interchangeably.

TABLE 2

Traffic Flow and QCI Binding Table

| Remote IP | local port | remote port | protocol | Packet QCI | Bearer level QCI | life time state | state |
|---|---|---|---|---|---|---|---|
| 199.239.136.200 | 51452 | 80 | TCP | 6 | 8 | 60 s | active |
| 85.183.195.96 | 51455 | 80 | TCP | 8 | 8 | 70 s | active |
| 74.125.43.149 | 51459 | 80 | UDP | 9 | 8 | 70 s | active |
| 2.18.175.139 | 51470 | 80 | TCP | 9 | 9 | 30 s | active |

At 204, the apparatus assigns a QCI value to a data packet for uplink transmission based at least in part on the created binding. For example, data packets for uplink transmission are mapped to QCI values according to flow table entries stored in the apparatus. Referring to the example in Table 2, the apparatus has received a downlink packet from 199.239.136.200:80 with QCI=6 via bearer with QCI=8. When the apparatus sends uplink packets to 199.239.200:80, the UE assigns a QCI value 6 to the packets.

In some example embodiments, the apparatus maintains a buffer for each of the received at least one traffic flow which have different traffic flow level QCI values. Traffic flows which have the same QCI values may use the same buffer. Referring to the example in Table 2, the apparatus maintains three buffers, each buffer corresponds to a packet level QCI value in the table.

The apparatus may report the assigned QCI value. In some example embodiments, the assigned QCI value may be reported via buffer status report. Besides the buffer status which indicates the amount of data available for transmission, the buffer status report may further comprise the assigned QCI value. Referring to the previous example where QCI value of 6 is assigned, the apparatus may insert the assigned QCI value of 6 as a new entry into the buffer status report. Some existing buffer status report signaling format may be used and QCI value may be added as a new entry to the existing format. For example, reference can be made to 3GPP TS 36.321 V11.3.0 (2013-03) 3rd Generation Partnership Project; Technical Specification Group Radio Access Network; Medium Access Control (MAC) protocol specification (Release 11). In some other example embodiments, the assigned QCI value may be reported via other existing or new signaling format.

In some example embodiments, the apparatus may send information to the network which indicates whether the apparatus supports inserting the assigned quality of service indication into the buffer status report. For example, the apparatus may send the information via UE capability information. For example, reference can be made to 3GPP TS 36.331 V11.3.0 (2013-03) 3rd Generation Partnership Project; Technical Specification Group Radio Access Network; Radio Resource Control (MAC) protocol specification (Release 11).

Figure 3:
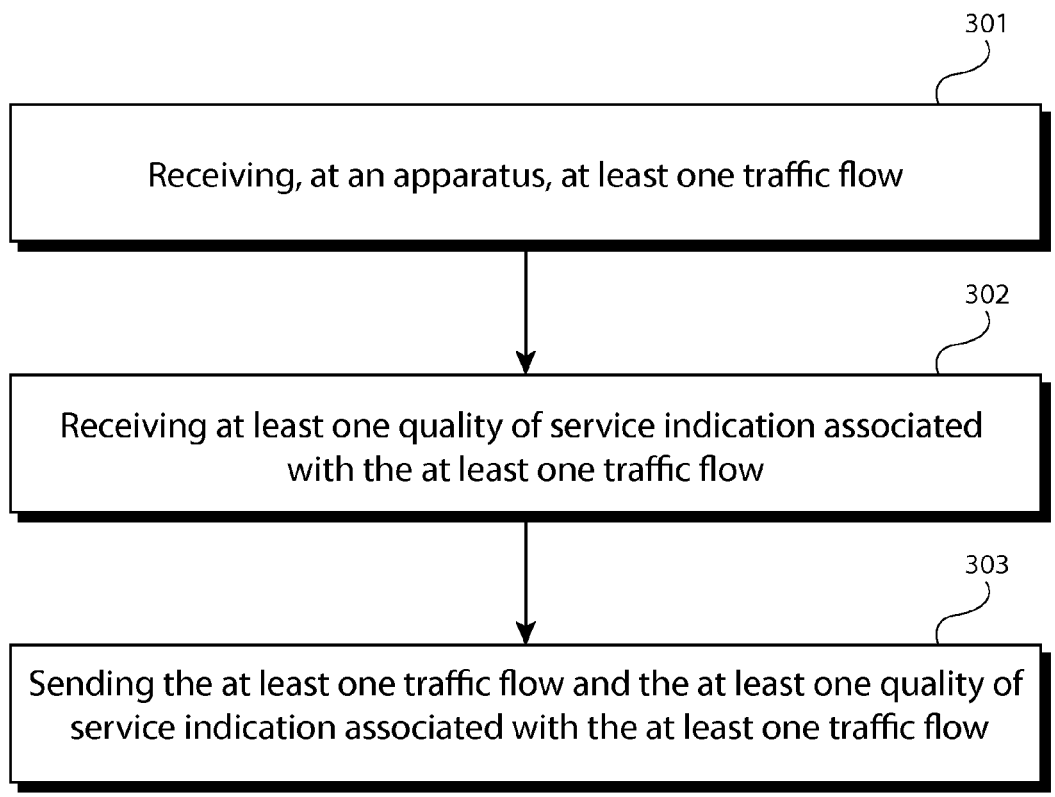
FIG. 3 depicts an example process for traffic flow differentiation at a base station in accordance with some embodiments of the invention.

FIG. 3 depicts an example process for traffic flow differentiation at a base station in accordance with some embodiments of the invention. The example process may be performed by or in an apparatus, such as a base station eNB 110.

At 301, the apparatus receives one or more traffic flows from core network.

At 302, the apparatus receives at least one quality of service indication associated with the one or more one traffic flow. In some example embodiments, the received at least one quality of service indication may comprise a bearer level QCI. In some example embodiments, the received at least one quality of service indication may further comprise a traffic flow level QCI.

In some example embodiments, QCI is carried from the core network to RAN via General Packet Radio System Tunnelling Protocol User Plane (GTP-U) header extension. GTP-U is an IP based tunneling protocol which permits many tunnels between each set of end points. For example, reference can be made to 3GPP TS 29.281 V11.6.0 (2013-03) 3rd Generation Partnership Project; Technical Specification Group Core Network and Terminals; General Packet Radio System (GPRS) Tunnelling Protocol User Plane (GTPv1-U) (Release 11).

At 303, the apparatus sends the received one or more traffic flows and the at least one quality of service indication associated with the one or more traffic flows to a user equipment. For example, the apparatus copies the received QCI value from the GTP-U header extension and sends the QCI value to the user equipment. In some example embodiment, the apparatus sends the QCI value to the user equipment via Packet Data Convergence Protocol (PDCP) or Radio Link Control (RLC) header extension. For example, reference can be made to 3GPP TS 36.322 V11.3.0 (2013-03) 3rd Generation Partnership Project; Technical Specification Group Radio Access Network; Radio Link Control (RLC) protocol specification (Release 11) and 3GPP TS 36.323 V11.3.0 (2013-03) 3rd Generation Partnership Project; Technical Specification Group Radio Access Network; Packet Data Convergence (PDCP) protocol specification (Release 11).

In some example embodiments, the apparatus receives a QCI value associated with a data packet to be transmitted. For example, the apparatus may receive buffer status report from a user equipment. The buffer status report comprises a QCI value associated with the data packets in the buffer.

The apparatus allocate radio resource for uplink data transmission. The allocated radio resource to a user equipment may be sent to the user equipment via downlink signaling. The apparatus may schedule data packet for uplink data transmission based at least in part on the received QCI value. For example, the apparatus may prioritize transmission for data packets with higher priority as indicated by the received QCI value.

In some example embodiments, the apparatus may receive capability information from a user equipment. The capability information indicates whether the user equipment supports inserting QCI value into the buffer status report. The apparatus may configure the reporting of QCI in the buffer status report based on the received capability information.

Figure 4:
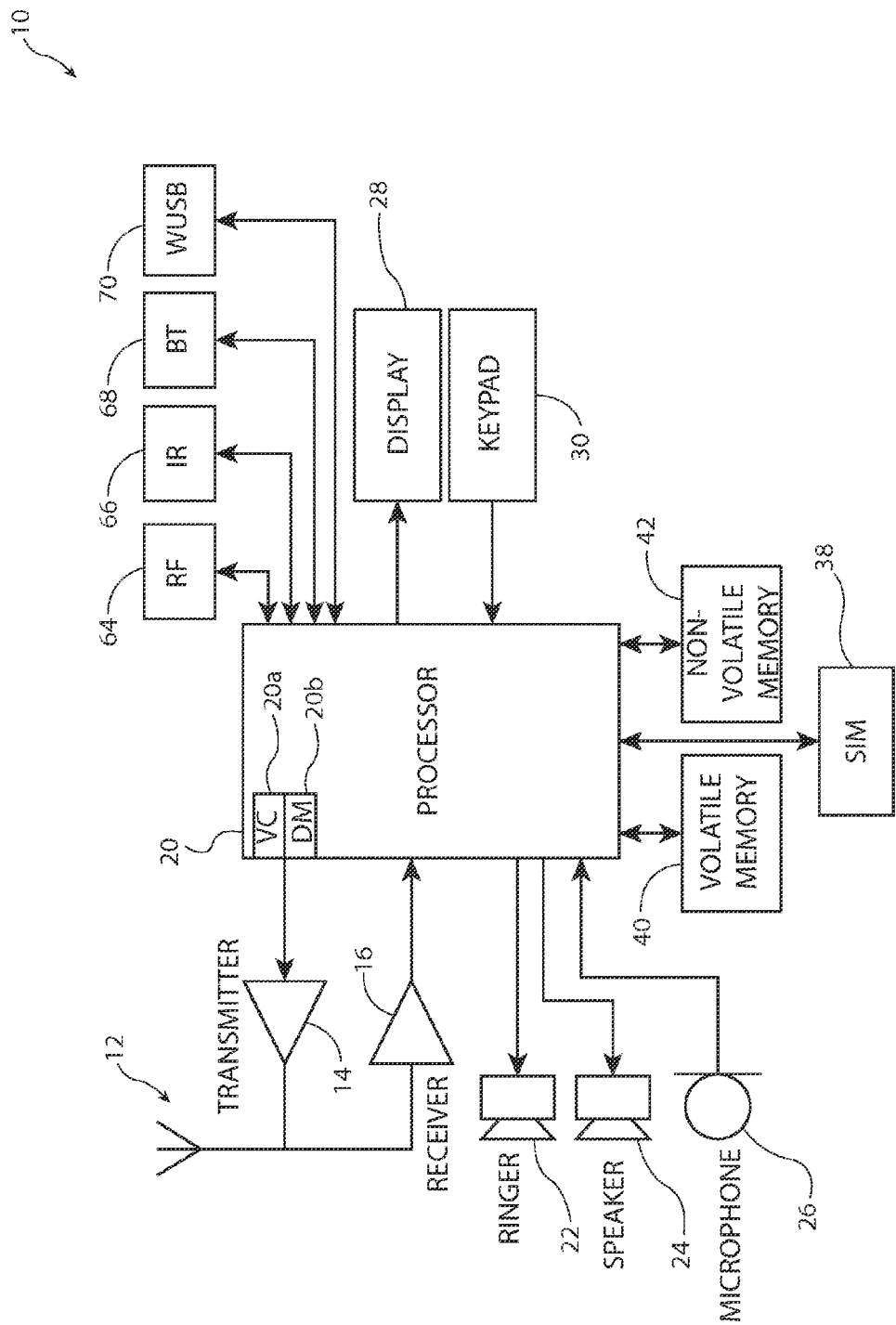
FIG. 4 illustrates an example implementation of a user equipment in accordance with some embodiments of the invention.

FIG. 4 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 4 as a single processor, in some embodiments the processor 20 comprises a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus 10 may comprise a battery for powering various circuits related to the apparatus, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 4, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment. The memories may comprise an identifier, such as for example, an international mobile equipment identification (IMEI) code, capable of uniquely identifying apparatus 10.

Figure 5:
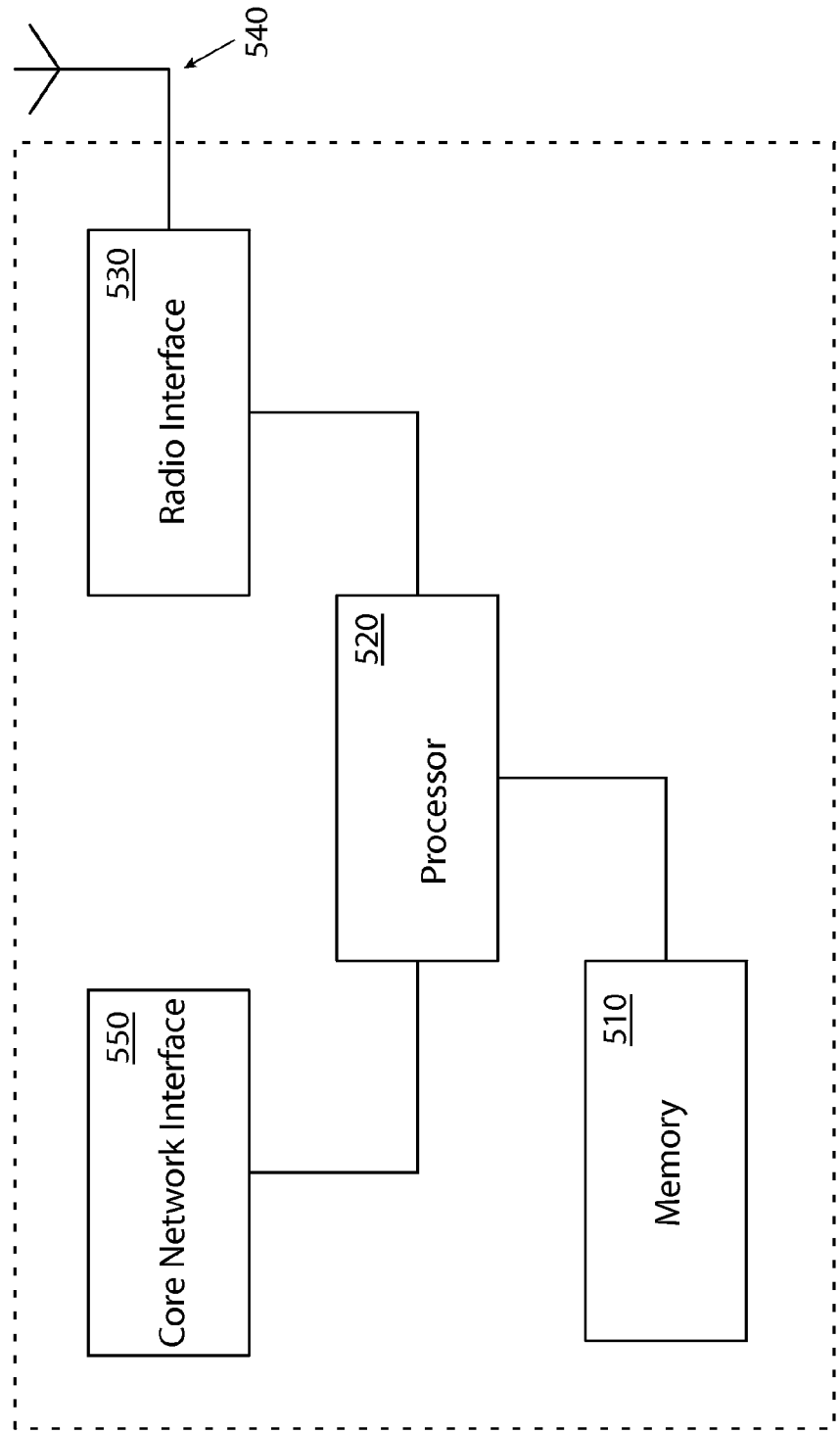
FIG. 5 illustrates an example implementation of a base station in accordance with some embodiments of the invention.

FIG. 5 depicts an example implementation of a base station in accordance with some embodiments of the invention, such as the base station eNB 110. The base station may include one or more antennas 540 configured to transmit via a downlink and configured to receive uplinks via the antenna (s). The base station may further include a plurality of radio interfaces 530 coupled to the antenna 540. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 530 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The base station may further include one or more core network interfaces 550, for receiving and transmitting to the core network. The base station may further include one or more processors, such as processor 520, for controlling the interfaces 530 and 550 and for accessing and executing program code stored in memory 510. In some example embodiments, the memory 510 includes code, which when executed by at least one processor causes one or more of the operations described herein with respect to a base station.

Without in any way limiting the scope, interpretation, or application of the claims appearing below, a technical effect of one or more of the example embodiments disclosed herein may include enabling traffic flow identification and prioritization to improve the user perceived service quality in radio network congestion situations.

Embodiments of the present invention may be implemented in software, hardware, application logic or a combination of software, hardware and application logic. The software, application logic and/or hardware may reside on memory 40 and/or 42, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 4 and FIG. 5. A computer-readable medium may comprise a computer-readable non-transitory storage medium that may be any media or means that can contain or store the instructions for use by or in connection with an instruction execution system, apparatus, or device, such as a computer. The scope of the present invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Other embodiments may be within the scope of the following claims. The term "based on" includes "based at least in part on".

What is claimed is:

1. A method, comprising:
   receiving, at an apparatus, at least one traffic flow;
   receiving at least one quality of service indication associated with the at least one traffic flow, wherein the received at least one quality of service indication associated with the at least one traffic flow comprises a traffic flow level quality of service indication and a bearer level quality of service indication;
   creating binding of the received at least one quality of service indication and information associated with the received at least one traffic flow; and
   assigning a quality of service indication to a data packet for transmission based at least in part on the created binding.

2. The method of claim 1, wherein the information associated with the received at least one traffic flow comprises at least one of the following: remote IP address, local port number, remote port number, and protocol ID.

3. The method of claim 1, wherein creating binding of the received at least one quality of service indication and information associated with the received at least one traffic flow comprises: creating a table which stores the binding of the received at least one quality of service indication and information associated with the received at least one traffic flow.

4. The method of claim 3, wherein assigning a quality of service indication to a data packet for transmission based at least in part on the created binding comprises:
   selecting an entry from the table where the destination address of the data packet for transmission matches with one of the information associated with the received at least one traffic flow; and
   assigning the quality of service indication value of the selected entry to the data packet for transmission.

5. The method of claim 1, further comprising: maintaining a buffer for each of the received at least one traffic flow which have different traffic flow level quality of service indication values.

6. The method of claim 1, further comprising: reporting buffer status, wherein the buffer status report comprises the assigned quality of service indication.

7. The method of claim 6, further comprising: sending capability information wherein the capability information comprises support of inserting the assigned quality of service indication into the buffer status report.

8. An apparatus, comprising:
   at least one processor; and
   at least one memory including computer program code, wherein the at least one memory and the computer program code are configured to, with the at least one processor, cause the apparatus to perform at least the following:
   receive at least one traffic flow;
   receive at least one quality of service indication associated with the at least one traffic flow, wherein the received at least one quality of service indication associated with the at least one traffic flow comprises a traffic flow level quality of service indication and a bearer level quality of service indication;
   create binding of the received at least one quality of service indication and information associated with the received at least one traffic flow; and
   assign a quality of service indication to a data packet for transmission based at least in part on the created binding.

9. The apparatus of claim 8, wherein the information associated with the received at least one traffic flow comprises at least one of the following: remote IP address, local port number, remote port number, and protocol ID.

10. The apparatus of claim 8, wherein creating binding of the received at least one quality of service indication and information associated with the received at least one traffic flow comprises: creating a table which stores the binding of the received at least one quality of service indication and information associated with the received at least one traffic flow.

11. The apparatus of claim 10, wherein assigning a quality of service indication to a data packet for transmission based at least in part on the created binding comprises:
    selecting an entry from the table where the destination address of the data packet for transmission matches with one of the information associated with the received at least one traffic flow; and
    assigning the quality of service indication value of the selected entry to the data packet for transmission.

12. The apparatus of claim 8, wherein the apparatus is caused to further perform: maintain a buffer for each of the received at least one traffic flow which have different traffic flow level quality of service indication values.

13. The apparatus of claim 8, wherein the apparatus is caused to further perform: report buffer status, wherein the buffer status report comprises the assigned quality of service indication.

14. The apparatus of claim 13, wherein the apparatus is caused to further perform: send capability information wherein the capability information comprises support of inserting the assigned quality of service indication into the buffer status report.

15. An apparatus, comprising:
    at least one processor; and
    at least one memory including computer program code, wherein the at least one memory and the computer program code are configured to, with the at least one processor, cause the apparatus to perform at least the following:
    receive at least one traffic flow;
    receive at least one quality of service indication associated with the at least one traffic flow, wherein the received at least one quality of service indication associated with the at least one traffic flow comprises a traffic flow level quality of service indication and a bearer level quality of service indication; and
    send the at least one traffic flow and the at least one quality of service indication associated with the at least one traffic flow.

16. The apparatus of claim 15, wherein the at least one quality of service indication associated with the at least one traffic flow is received via General Packet Radio System Tunnelling Protocol User Plane header extension.

17. The apparatus of claim 15, wherein the at least one quality of service indication associated with the at least one traffic flow is sent via Packet Data Convergence Protocol or Radio Link Control protocol header extension.

18. The apparatus of claim 15, wherein the apparatus is caused to further perform:
    receive buffer status report, wherein the buffer status report comprises a quality of service indication; and
    schedule data packet for transmission based at least in part on the received buffer status report.

\* \* \* \* \*